(12) United States Patent
Hughes et al.

(10) Patent No.: US 10,935,292 B2
(45) Date of Patent: Mar. 2, 2021

(54) LUBRICANT QUALITY MANAGEMENT FOR A COMPRESSOR

(71) Applicant: TRANE INTERNATIONAL INC., Davidson, NC (US)

(72) Inventors: Kevin P. Hughes, La Crosse, WI (US); Robert S. Bakkestuen, West Salem, WI (US); Timothy S. Hagen, Onalaska, WI (US); Keith Adam Novak, La Crosse, WI (US); Daniel R. Dreher, La Crosse, WI (US); Alberto Scala, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 124 days.

(21) Appl. No.: 16/008,883

(22) Filed: Jun. 14, 2018

(65) Prior Publication Data

US 2019/0383539 A1 Dec. 19, 2019

(51) Int. Cl.
*F25B 1/047* (2006.01)
*F25B 43/02* (2006.01)
(Continued)

(52) U.S. Cl.
CPC ............ *F25B 49/022* (2013.01); *F25B 1/047* (2013.01); *F25B 31/002* (2013.01); *F25B 43/02* (2013.01);
(Continued)

(58) Field of Classification Search
CPC ...... F25B 49/022; F25B 1/047; F25B 31/002; F25B 43/02; F25B 2500/16;
(Continued)

(56) References Cited

U.S. PATENT DOCUMENTS 3,777,509 A 12/1973 Muench
6,058,727 A * 5/2000 Fraser, Jr. ............. F25B 31/002
62/190

(Continued)

FOREIGN PATENT DOCUMENTS

WO 2013/165841 A1 11/2013
WO 2017/007708 A1 1/2017

OTHER PUBLICATIONS

Partial European Search Report, European Patent Application No. 19179286.0, dated Dec. 6, 2019 (12 pages).

*Primary Examiner* — Frantz F Jules
*Assistant Examiner* — Lionel Nouketcha
(74) *Attorney, Agent, or Firm* — Hamre, Schumann, Mueller & Larson, P.C.

(57) ABSTRACT

A heating, ventilation, air conditioning, and refrigeration (HVACR) system is disclosed. The HVACR system includes a refrigerant circuit. The refrigerant circuit includes a compressor, a condenser, an expansion device, and an evaporator fluidly connected. A controller is electronically connected to the compressor. The controller is configured to prevent the compressor from operating at a speed that is less than a minimum speed limit. A lubricant separator has an inlet fluidly connected between the compressor and the condenser and a plurality of outlets. A first of the plurality of outlets is fluidly connected to the condenser. A second of the plurality of outlets is fluidly connected to one or more components of the compressor to provide a lubricant to the one or more components.

14 Claims, 7 Drawing Sheets

(51) Int. Cl.
  *F25B 49/02* (2006.01)
  *F25B 31/00* (2006.01)

(52) U.S. Cl.
  CPC ....... *F25B 2500/16* (2013.01); *F25B 2500/19* (2013.01); *F25B 2600/0253* (2013.01); *F25B 2700/171* (2013.01); *F25B 2700/1931* (2013.01); *F25B 2700/1933* (2013.01); *F25B 2700/21151* (2013.01); *F25B 2700/21152* (2013.01)

(58) Field of Classification Search
  CPC ........ F25B 2600/0253; F25B 2700/171; F25B 2700/1931; F25B 2700/1933; F25B 2700/21151; F25B 2700/21152
  See application file for complete search history.

(56) References Cited

U.S. PATENT DOCUMENTS

| | | |
|---|---|---|
| 6,082,982 A | 7/2000 | Rosser et al. |
| 6,182,467 B1 | 2/2001 | Zhong et al. |
| 6,658,885 B1 | 12/2003 | Zhou et al. |
| 6,672,102 B1 | 1/2004 | Huenniger et al. |
| 7,739,882 B2* | 6/2010 | Evans .................. B60H 1/3213 236/51 |
| 8,459,053 B2 | 6/2013 | Pham et al. |
| 2004/0098996 A1 | 5/2004 | Sishtla |
| 2008/0210601 A1 | 9/2008 | Shoulders |
| 2008/0271477 A1 | 11/2008 | Holmes |
| 2011/0100040 A1* | 5/2011 | Bush ........................ F25B 1/10 62/149 |
| 2011/0110791 A1* | 5/2011 | Donnat ................ B60H 1/3232 417/18 |
| 2014/0216103 A1 | 8/2014 | Ignatiev et al. |
| 2015/0056059 A1* | 2/2015 | Crane ................... F04D 27/002 415/1 |
| 2015/0075766 A1* | 3/2015 | Alston .................... F25B 49/02 165/287 |
| 2016/0003511 A1 | 1/2016 | Esformes et al. |
| 2016/0153688 A1 | 6/2016 | Ronk et al. |
| 2016/0265824 A1 | 9/2016 | Molavi et al. |
| 2016/0290671 A1 | 10/2016 | Schuster et al. |
| 2017/0240024 A1* | 8/2017 | Blatchley ........... B60H 1/00007 |

* cited by examiner

LUBRICANT QUALITY MANAGEMENT FOR A COMPRESSOR

FIELD

This disclosure relates generally to a heating, ventilation, air conditioning, and refrigeration (HVACR) system. More specifically, this disclosure relates to lubricant quality management for a compressor in an HVACR system.

BACKGROUND

A heating, ventilation, air conditioning, and refrigeration (HVACR) system generally includes a compressor. Compressors, such as, but not limited to, screw compressors and scroll compressors, utilize bearings to support a rotating shaft. The bearings generally include a lubricant system. If the bearings are not properly lubricated, the bearings, and ultimately the compressor, may fail prior to an expected lifetime of the bearing.

SUMMARY

This disclosure relates generally to a heating, ventilation, air conditioning, and refrigeration (HVACR) system. More specifically, this disclosure relates to lubricant quality management for a compressor in an HVACR system.

In an embodiment, an HVACR system includes a variable speed compressor. In an embodiment, the variable speed compressor is a positive displacement compressor.

In an embodiment, the variable speed compressor is a variable speed screw compressor. In an embodiment, the variable speed screw compressor can be operated between a minimum and a maximum speed. In an embodiment, a minimum speed limit can be set to be a value that is greater than a minimum speed at which the variable speed compressor is capable of operating. For example, a minimum speed limit can be determined for a selected compressor efficiency and bearing size based on a saturated suction temperature and a saturated discharge temperature of a selected refrigerant and lubricant.

In an embodiment, the selected refrigerant includes a refrigerant having a low discharge superheat and that is miscible with the selected lubricant, which can result in a high lubricant dilution.

In an embodiment, the selected refrigerant includes a refrigerant having a relatively lower global warming potential (GWP) than R-134a and that may be utilized as a replacement refrigerant for R-134a.

In an embodiment, the selected refrigerant can be R1234ze(E), R-513A, or the like.

In an embodiment, the minimum speed limit is inversely related to bearing size. That is, in an embodiment, as bearing size decreases, the minimum speed limit increases.

In an embodiment, the HVACR system includes a lubricant separator. The lubricant separator can incorporate a lubricant tank. In an embodiment, combining the lubricant separator and the lubricant tank may reduce an overall complexity of the HVACR system.

A heating, ventilation, air conditioning, and refrigeration (HVACR) system is disclosed. The HVACR system includes a refrigerant circuit. The refrigerant circuit includes a compressor, a condenser, an expansion device, and an evaporator fluidly connected. A controller is electronically connected to the compressor. The controller is configured to prevent the compressor from operating at a speed that is less than a minimum speed limit. A lubricant separator has an inlet fluidly connected between the compressor and the condenser and a plurality of outlets. A first of the plurality of outlets is fluidly connected to the condenser. A second of the plurality of outlets is fluidly connected to one or more components of the compressor to provide a lubricant to the one or more components.

A method of controlling a variable speed compressor is also disclosed. The method includes determining, using a controller of the variable speed compressor, a saturated suction temperature, and a saturated discharge temperature and calculating, using the controller of the variable speed compressor, a minimum speed limit for the variable speed compressor based on the saturated suction temperature and the saturated discharge temperature. The controller receives a cooling requirement and determines a speed setting for the variable speed compressor based on the cooling requirement. In response to determining that the speed setting is less than the minimum speed limit as calculated, the controller overrides the speed setting and utilizes the minimum speed limit and cools to meet the cooling requirement.

A lubricant separator for a heating, ventilation, air conditioning, and refrigeration (HVACR) system is also disclosed. The lubricant separator includes a first chamber and a second chamber. A conduit disposed in the first chamber fluidly connects the first chamber to the second chamber. The first chamber includes an inlet that receives a high pressure refrigerant/lubricant mixture and an outlet that provides a high pressure refrigerant. The second chamber receives a lubricant portion of the refrigerant/lubricant mixture via the conduit. The second chamber includes an outlet via which a low pressure lubricant is provided.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

This disclosure relates generally to a heating, ventilation, air conditioning, and refrigeration (HVACR) system. More specifically, this disclosure relates to lubricant quality management for a compressor in an HVACR system.

Environmental impacts of HVACR refrigerants are a growing concern. For example, since 2011, the European Union has been phasing out refrigerants with a global warming potential (GWP) of more than, for example, 150 in some refrigeration systems. Environmentally-suitable HVACR refrigerants, with suitable properties such as density, vapor pressure, heat of vaporization, and suitable chemical properties, which satisfy the requirements regarding safety and environment impacts, such as the European Union Standard discussed above, can be utilized for HVACR systems. The environmentally-suitable HVACR refrigerants are nonflammable or mildly flammable, non-ozone depleting, energy efficient, low in toxicity, compatible with materials of construction, and are chemically stable over the life of the equipment.

Current refrigerants, such as R134a or the like, may have relatively higher GWPs. For example, R134a has a GWP of 1,430. As a result, replacement refrigerants such as, but not limited to, R1234ze(E), R513A, and the like, are being implemented in HVACR systems.

In utilizing newer refrigerant compositions such as, but not limited to, R1234ze(E) and R513A, various problems may arise as a result of the different properties of the refrigerant compared to prior refrigerants such as R134a. In general, refrigerants with lower GWPs such as R1234ze(E), R513A, and the like may be carried over into the lubricant. In some instances, the replacement refrigerants are relatively more miscible in the lubricant than the current refrigerants, resulting in a higher concentration of refrigerant within the lubricant (e.g., lubricant dilution).

As a result, portions of an operating map for a compressor of the HVACR system may suffer from higher lubricant dilution and limited bearing viscosity due to low discharge superheat. In some instances, the higher lubricant dilution and limited bearing viscosity problems may be more significant when the variable speed compressor operates at relatively lower speeds. Higher lubricant dilution and limited bearing viscosity can result in, for example, a shortened lifetime for the bearings and ultimately compressor failures. In some instances, utilizing the replacement refrigerants may require a replacement of the mechanical components (e.g., bearings, etc.) in the compressor.

In other instances, controlling a variable speed compressor to maximize efficiency can also result in lubricant dilution problems, even when utilizing the current refrigerants such as R134a.

In general, lubricants utilized with R134a replacement refrigerants suffer the higher lubricant dilution problem. The lubricants can include any suitable lubricant which is miscible with the selected replacement refrigerant.

In general, higher lubricant dilution may become a problem when discharge superheat becomes relatively low. For example, higher lubricant dilution can occur when the discharge superheat is below at or about 8° C.

In an embodiment, a minimum speed limit can be set for a variable speed compressor to limit or avoid reaching operating conditions in which higher lubricant dilution and limited bearing viscosity are problematic. As a result, existing mechanical components (e.g., bearings, etc.) may be utilized. Providing a minimum speed limit for the variable speed compressor can, for example, control a pitch velocity (average diameter times the speed) of the bearing. As a result, a bearing lifetime can be improved. In an embodiment, the minimum speed limit can be selected based on saturated suction and discharge temperatures in combination with a compressor frame size. In an embodiment, the compressor frame size can include a bearing size and compressor efficiency.

In an embodiment, a compressor for an HVACR system is a screw compressor. In an embodiment, the screw compressor is a variable speed screw compressor capable of operating at various speeds between a minimum speed and a maximum speed.

According to an embodiment, a minimum speed for a variable speed compressor can be selected based on discharge superheat.

In an embodiment, the minimum speed for the variable speed compressor can be selected based on a saturated suction temperature and a saturated discharge temperature.

Figure 1:
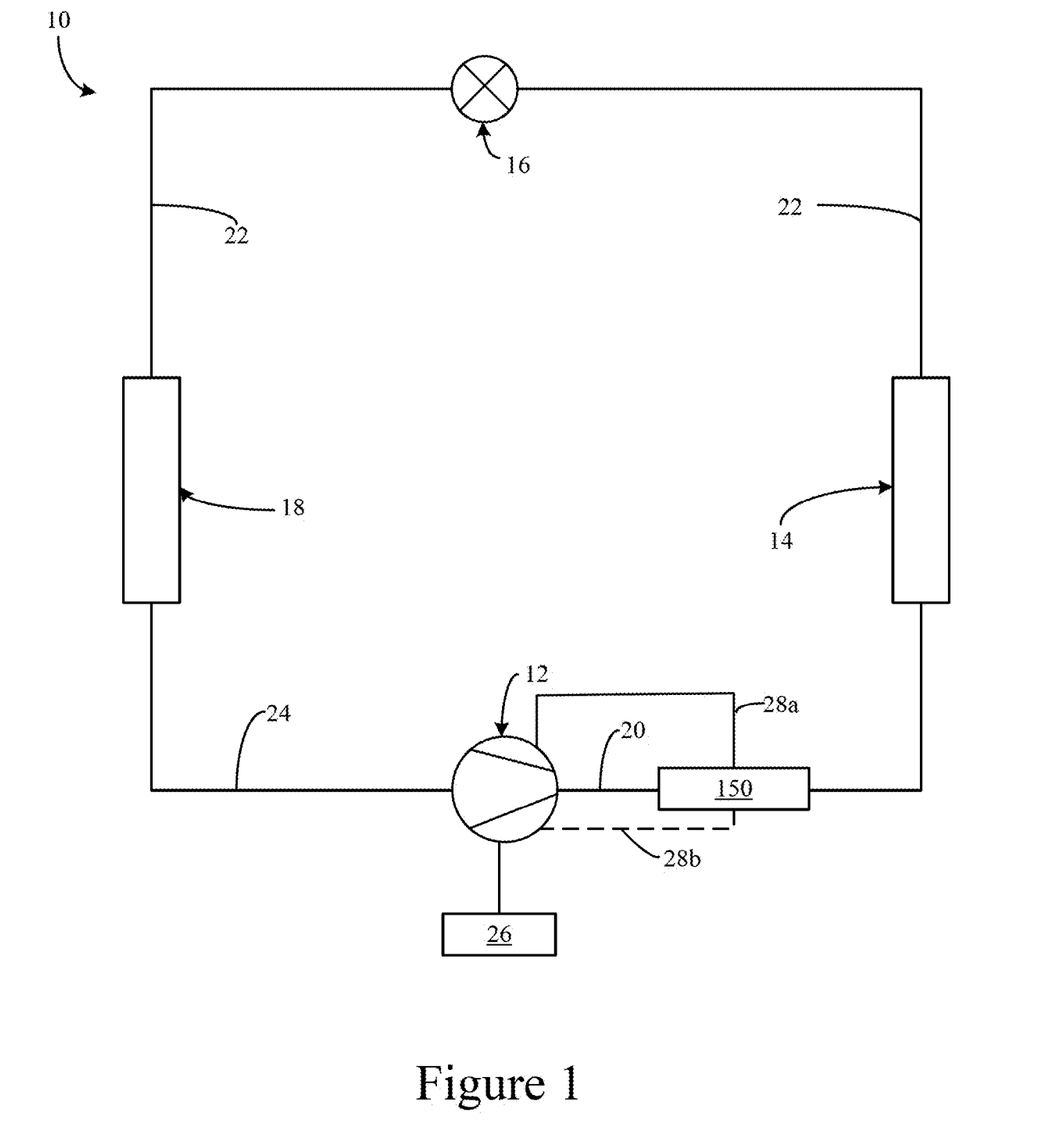
FIG. 1 is a schematic diagram of a refrigerant circuit, according to an embodiment.

FIG. 1 is a schematic diagram of a refrigerant circuit 10, according to an embodiment. The refrigerant circuit 10 generally includes a compressor 12, a condenser 14, an expansion device 16, an evaporator 18, and a lubricant separator 150.

The refrigerant circuit 10 is an example and can be modified to include additional components. For example, in an embodiment, the refrigerant circuit 10 can include other components such as, but not limited to, an economizer heat exchanger, one or more flow control devices, a receiver tank, a dryer, a suction-liquid heat exchanger, or the like.

The refrigerant circuit 10 can generally be applied in a variety of systems used to control an environmental condition (e.g., temperature, humidity, air quality, or the like) in a space (generally referred to as a conditioned space). Examples of such systems include, but are not limited to, HVACR systems, transport refrigeration systems, or the like.

The compressor 12, condenser 14, expansion device 16, and evaporator 18 are fluidly connected via refrigerant lines 20, 22, 24. In an embodiment, the refrigerant lines 20, 22, and 24 can alternatively be referred to as the refrigerant conduits 20, 22, and 24, or the like.

In an embodiment, the refrigerant circuit 10 can be configured to be a cooling system (e.g., an air conditioning system) capable of operating in a cooling mode. In an embodiment, the refrigerant circuit 10 can be configured to be a heat pump system that can operate in both a cooling mode and a heating/defrost mode.

The refrigerant circuit 10 can operate according to generally known principles. The refrigerant circuit 10 can be configured to heat or cool a gaseous process fluid (e.g., a heat transfer medium or fluid such as, but not limited to, air or the like), in which case the refrigerant circuit 10 may be generally representative of an air conditioner or heat pump.

In operation, the compressor 12 compresses a working fluid (e.g., a heat transfer fluid such as a refrigerant or the like) from a relatively lower pressure gas (e.g., suction pressure) to a relatively higher-pressure gas (e.g., discharge pressure). In an embodiment, the compressor 12 can be a positive displacement compressor. In an embodiment, the positive displacement compressor can be a screw compressor, a scroll compressor, a reciprocating compressor, or the like. In an embodiment, the compressor 12 can be a centrifugal compressor.

The relatively higher-pressure gas is also at a relatively higher temperature, which is discharged from the compressor 12 and flows through refrigerant line 20 to the condenser 14. The working fluid flows through the condenser 14 and rejects heat to a process fluid (e.g., water, air, etc.), thereby cooling the working fluid. The cooled working fluid, which is now in a liquid form, flows to the expansion device 16 via the refrigerant line 22. The expansion device 16 reduces the pressure of the working fluid. As a result, a portion of the working fluid is converted to a gaseous form. The working fluid, which is now in a mixed liquid and gaseous form flows to the evaporator 18 via the refrigerant line 22. The working fluid flows through the evaporator 18 and absorbs heat from a process fluid (e.g., water, air, etc.), heating the working fluid, and converting it to a gaseous form. The gaseous working fluid then returns to the compressor 12 via the refrigerant line 24. The above-described process continues while the refrigerant circuit is operating, for example, in a cooling mode (e.g., while the compressor 12 is enabled).

The refrigerant circuit 10 can include a lubricant separator 150 disposed between the compressor 12 and the condenser 14. The lubricant separator 150 is shown and described in additional detail in accordance with FIGS. 5A-5C below. The lubricant separator 150 is fluidly connected to a discharge of the compressor 12 via the refrigerant line 20. The lubricant separator 150 is fluidly connected to the compressor 12 to provide lubricant to various components of the compressor 12 (e.g., bearings, etc.) via lubricant return line 28a and optionally via a second lubricant return line 28b. It will be appreciated that the number of lubricant return lines 28a, 28b can be selected based on, for example, which components of the compressor are being provided with lubricant.

Figure 2:
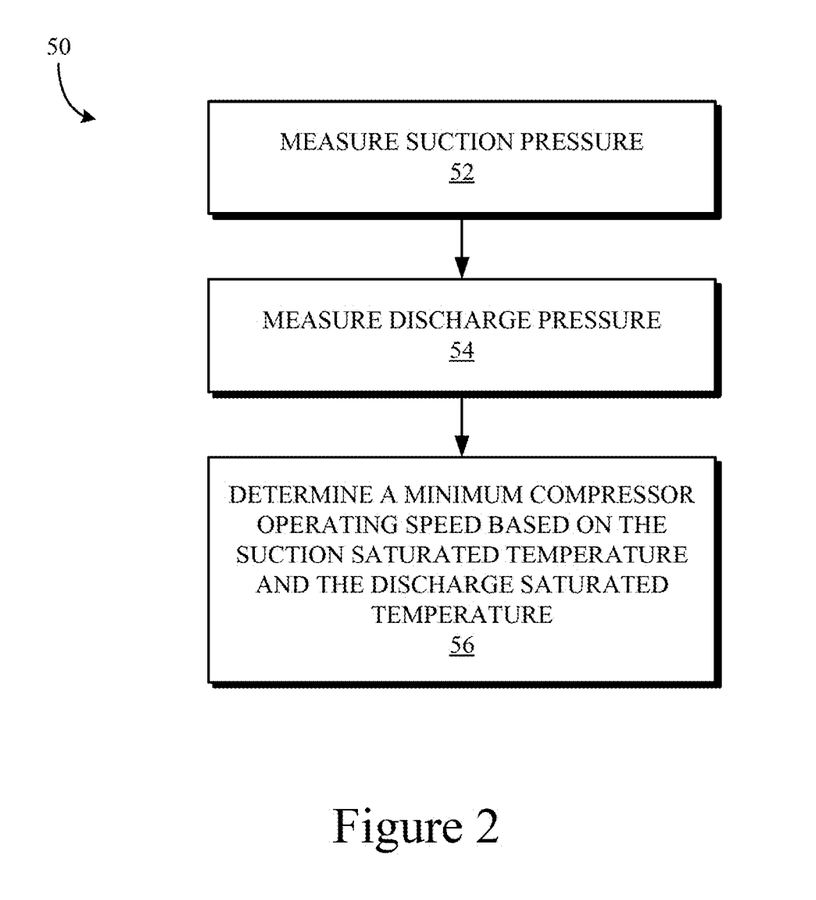
FIG. 2 is a flowchart of a method for determining a minimum speed limit for a variable speed compressor, according to an embodiment.

FIG. 2 is a flowchart of a method 50 for determining a minimum speed limit for a variable speed compressor (e.g., the compressor 12 in FIG. 1), according to an embodiment. The method 50 may be specific to a selected compressor size. The selected compressor size and corresponding execution of the method 50 can be based on, for example, a size of the bearings in the compressor and an efficiency requirement of the compressor. The method 50 can be performed by a controller (e.g., the controller 26 in FIG. 1) of the compressor, according to an embodiment. In an embodiment, the method 50 can be performed for a family of compressors and the determined minimum speed limit can be included in the controls of the compressor. An example of a control method for the compressor 12 is shown and described in accordance with FIG. 3 below.

At 52 a suction pressure is measured for the HVACR system. The suction pressure in combination with the refrigerant selected (e.g., R-134a, R1234ze(E), R-513A, etc.) can be used to determine the saturated suction temperature. In an embodiment, a suction temperature can alternatively be measured, although assumptions would have to be made regarding an amount of superheat which may make the determination less accurate than using the suction pressure.

At 54 a discharge pressure is measured for the HVACR system. The discharge pressure in combination with the refrigerant selected (e.g., R-134a, R1234ze(E), R-513A, etc.) can be used to determine the saturated discharge temperature. In an embodiment, a discharge temperature can alternatively be measured, although assumptions would have to be made regarding an amount of superheat which may make the determination less accurate than using the discharge pressure.

At 56, the selected saturated suction temperature and the selected saturated discharge temperature are used to determine a minimum speed limit for the variable speed compressor. The minimum speed limit generally is dependent upon the refrigerant, the lubricant, the bearing size in the compressor, and the compressor performance. In an embodiment, as the bearing size decreases, the minimum speed limit increases. The minimum speed limits can be determined, for example, by testing or modeling discharge temperatures of the variable speed compressor relative to bearing cavity temperatures for the bearings in the variable speed compressor and performing a surface fit to determine a minimum speed limit equation. In general, when the bearing reaches a pitch velocity below or at or about 300,000 mm/min, a minimum speed limit may be needed to prevent higher lubricant dilution. Accordingly, a pitch velocity below or at or about 300,000 mm/min may be considered a lower speed while above 300,000 mm/min may be considered a higher speed.

Figure 4:
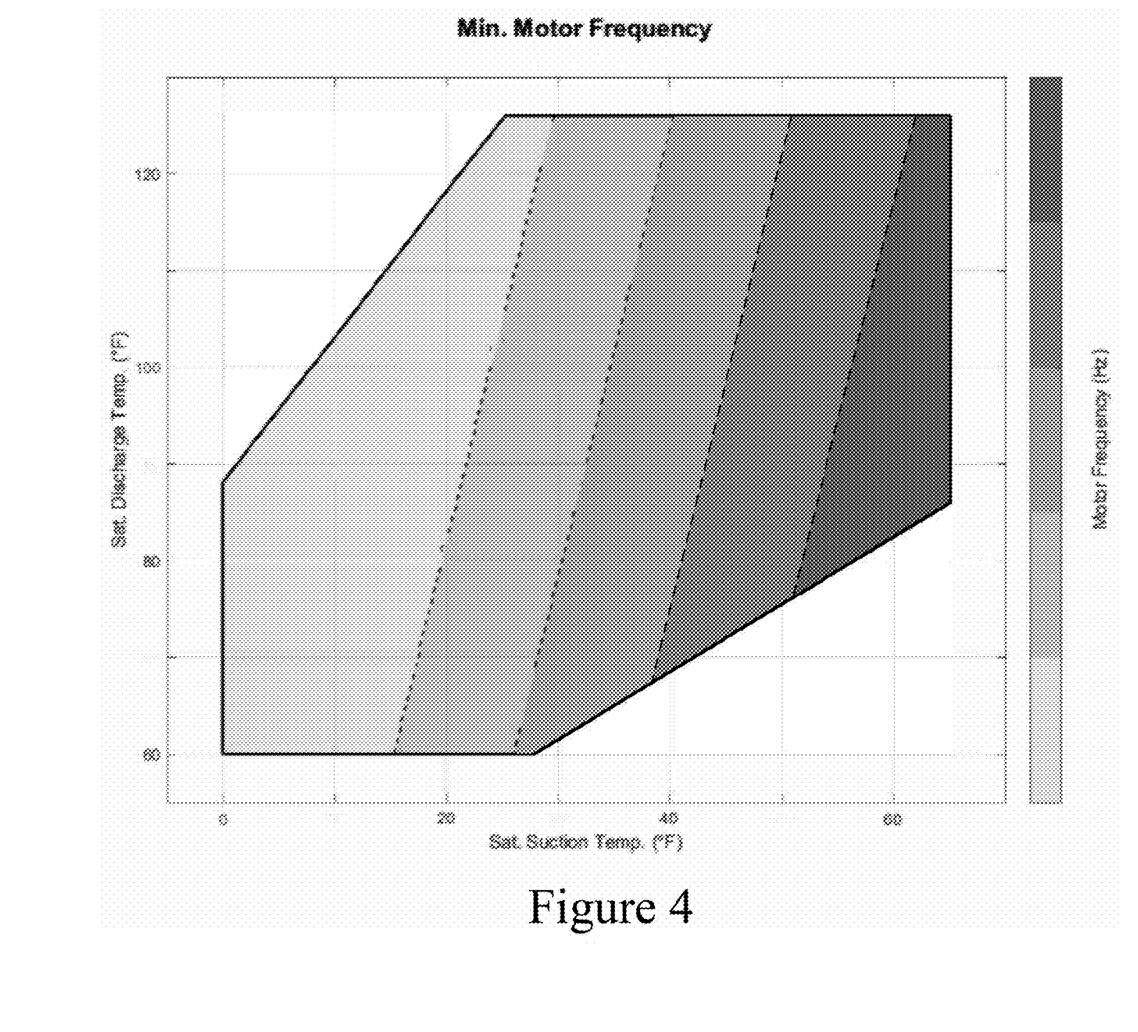
FIG. 4 illustrates a minimum operating frequency for a variable speed motor in an HVACR system, according to an embodiment.

With reference to FIG. 4, example minimum motor frequencies as determined according to the method 50 are shown, according to an embodiment. FIG. 4 represents a selected bearing size. It will be appreciated that the minimum motor frequency plot in FIG. 4 is dependent upon a refrigerant selected (e.g., R1234ze(E), etc.), a bearing size, and a lubricant selected. In the figure, the x-axis shows the saturated suction temperature (in ° F.) and the y-axis shows the saturated discharge temperature (in ° F.). The motor frequencies are represented from relatively lower to relatively higher in various shades. As shown in the figure, at lower saturated suction and saturated discharge temperatures, the minimum motor frequency is relatively lower than at relatively higher saturated suction and saturated discharge temperatures.

Figure 3:
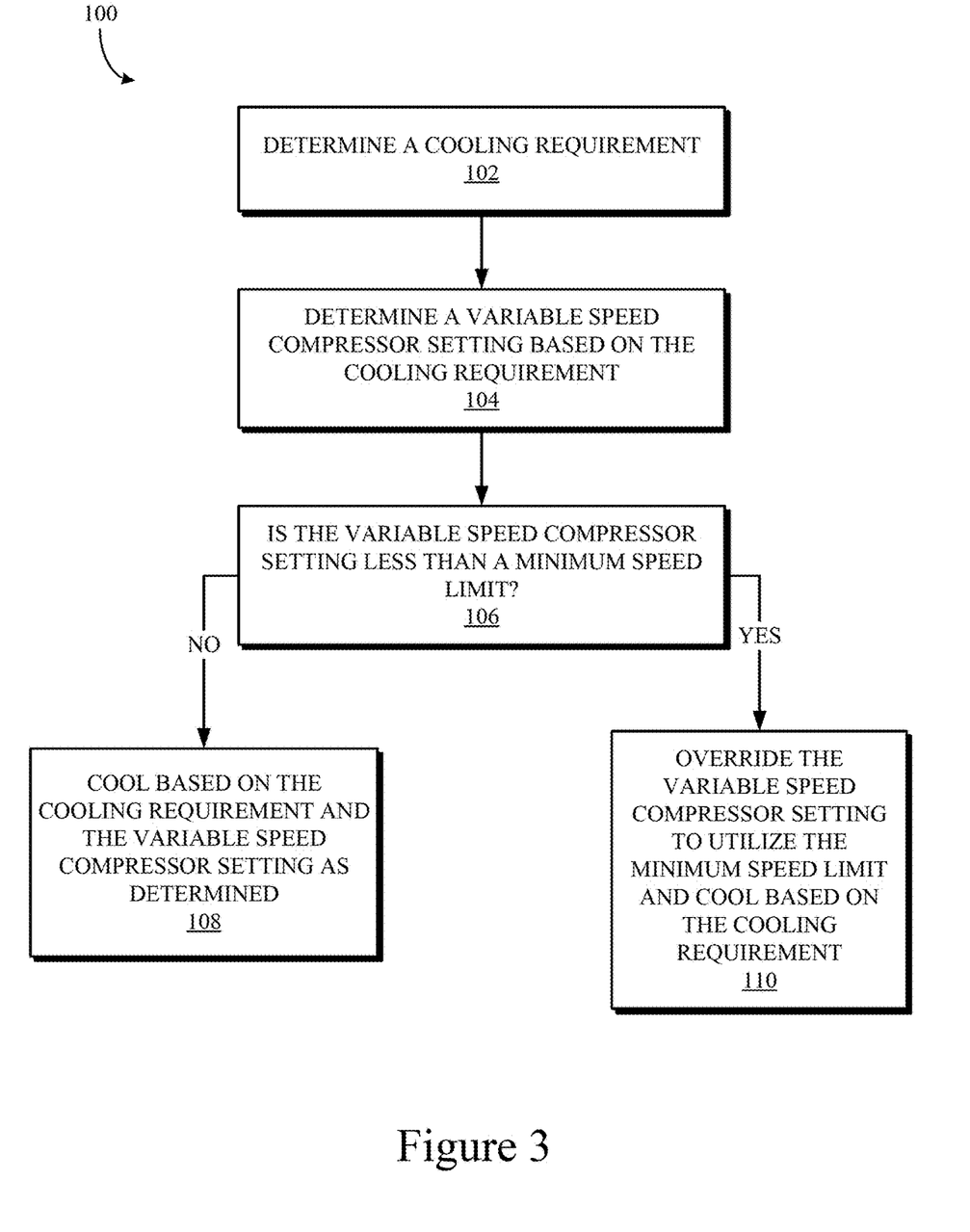
FIG. 3 is a flowchart of a method for operating a variable speed compressor to maintain a minimum bearing lubricant film thickness, according to an embodiment.

FIG. 3 is a flowchart of a method 100 for operating a variable speed compressor (e.g., the compressor 12 in FIG. 1) to maintain a minimum bearing lubricant film thickness, according to an embodiment. The method 100 generally includes operating an HVACR system (e.g., refrigerant circuit 10 in FIG. 1) based on a cooling requirement and a minimum speed limit.

The method 100 begins at 102. At 102, a controller (e.g., a thermostat or the like) determines a cooling requirement. The cooling requirement may be determined based on a setting in the thermostat, one or more sensors in a conditioned space, a building automation system, and/or a controller of the HVACR system (e.g., the refrigerant circuit 10 shown in FIG. 1), or the like.

At 104, the controller determines a variable speed compressor setting based on the cooling requirement. In an embodiment, this can include a target speed setting for the compressor 12. In an embodiment, this can include a speed setting for the compressor 12 that is less than its target speed. In an embodiment, the target speed may be the maximum speed.

At 106, the controller 26 determines whether the variable speed compressor setting as determined is less than a minimum speed limit (e.g., as determined in the method 50 in FIG. 2).

At 108, the controller sets one or more cooling settings for the HVACR system based on the cooling requirement and the variable speed compressor setting as determined in 104.

At 110, if the variable speed compressor setting as determined in 104 was less than the minimum speed limit (e.g., as discussed in the method 50 in FIG. 2), the controller 26 overrides the variable speed compressor setting (e.g., as determined at 104) to utilize the minimum speed limit and cools according to the cooling requirement.

Figure 5A:
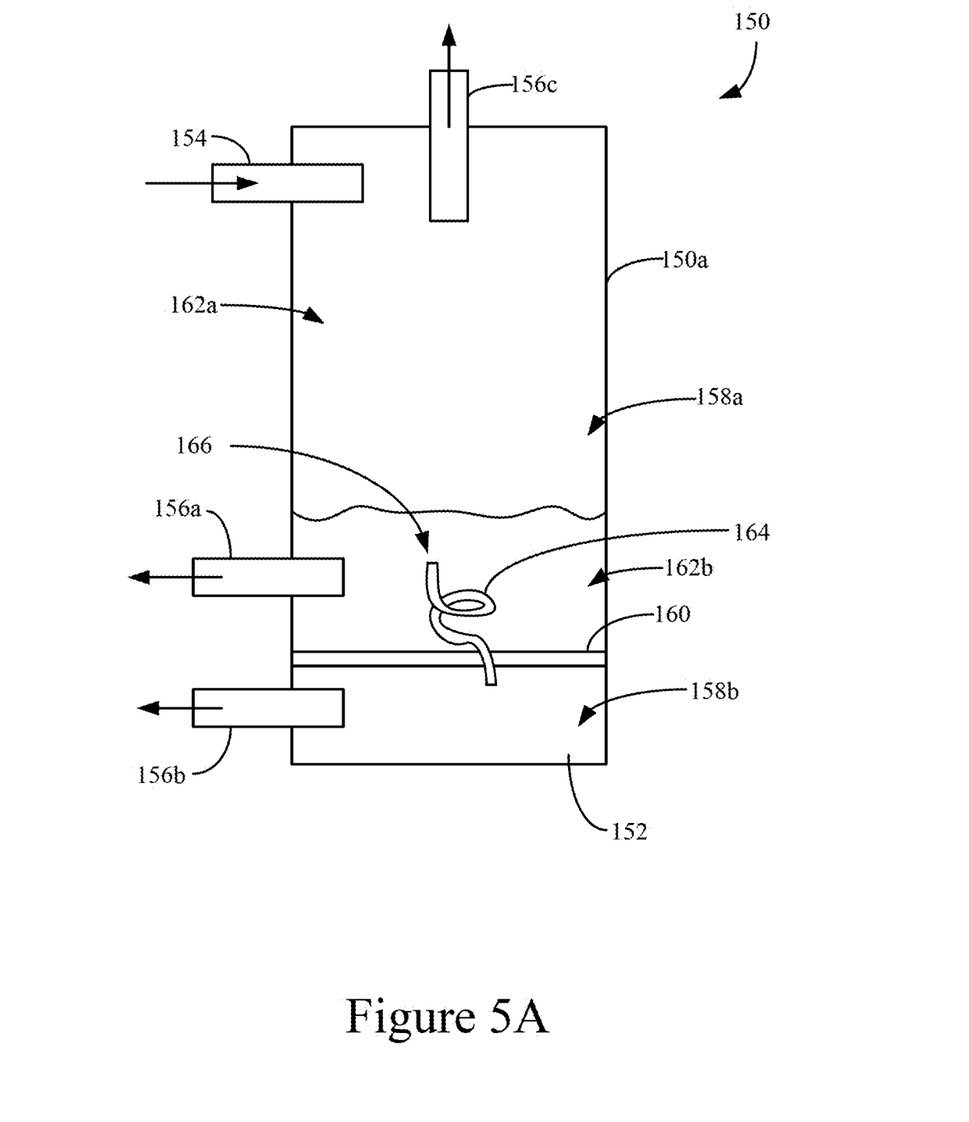
FIG. 5A illustrates a lubricant separator, according to an embodiment.
Figure 5B:
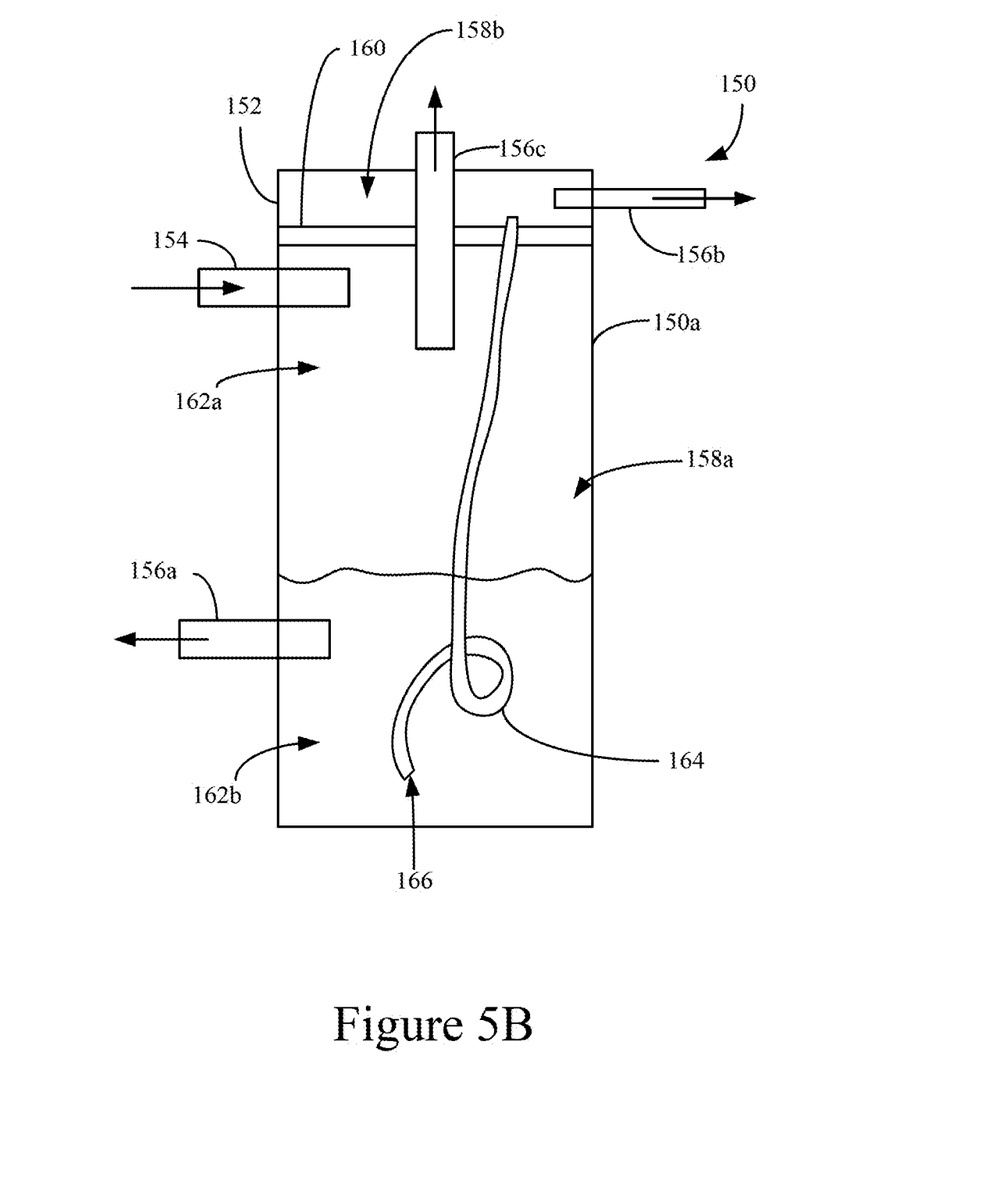
FIG. 5B illustrates a lubricant separator, according to an embodiment.
Figure 5C:
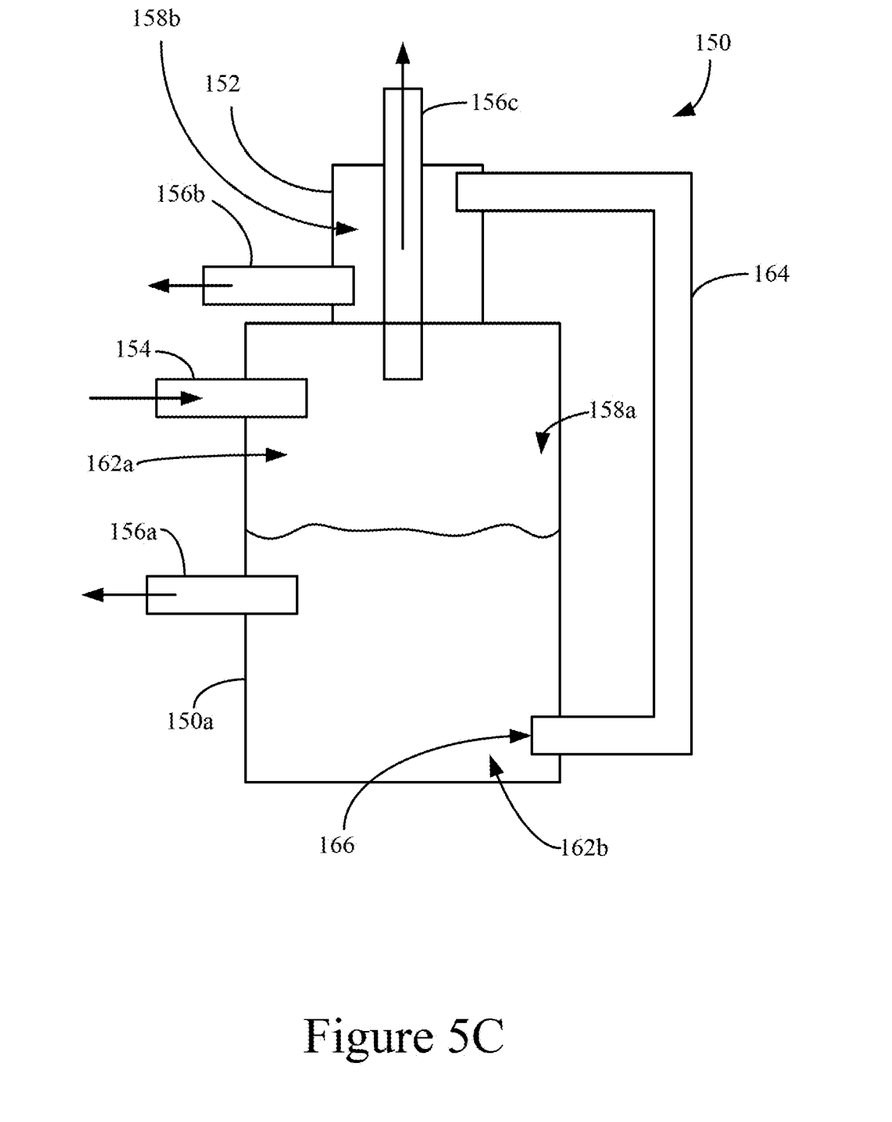
FIG. 5C illustrates a lubricant separator, according to an embodiment.

FIGS. 5A-5C illustrate a lubricant separator 150, according to an embodiment. In an embodiment, the lubricant separator 150 can be utilized to provide heat to lubricant prior to injecting the lubricant into bearing cavities of a compressor (e.g., the compressor 12 in FIG. 1), thereby reducing a problem of higher lubricant dilution in the HVACR system. In general, a low pressure lubricant can be heated using a higher temperature refrigerant/lubricant mixture as the refrigerant lubricant mixture flashes to maintain a temperature of the low pressure lubricant at or about the discharge temperature. In an embodiment, heating the low pressure lubricant can, for example, reduce an amount of refrigerant that is present in the lubricant, thereby reducing an amount of lubricant dilution.

In an embodiment, the lubricant separator 150 can be included in an HVACR system that includes controls described in FIGS. 2 and 3 above. In an embodiment, the lubricant separator 150 can be included in an HVACR system that does not include the controls described in FIGS. 2 and 3 above.

In an embodiment, the lubricant separator 150 can be included in an HVACR system including a fixed speed compressor. In an embodiment, the lubricant separator 150 can be included in an HVACR system including a variable speed compressor. In an embodiment, the variable speed compressor can include the minimum speed limit controls described above.

The lubricant separator 150 includes a housing 150a. The housing 150a of the lubricant separator 150 incorporates a lubricant tank 152. In an embodiment, the lubricant tank 152 can be referred to as the lubricant sump 152. The lubricant separator 150 includes inlet 154 and outlets 156a, 156b, and 156c.

The inlet 154 is fluidly connected to a discharge of the compressor 12 (e.g., via refrigerant line 20 in FIG. 1).

The outlet 156a is fluidly connected to a first compressor component. In an embodiment, the first compressor component can include a component such as, but not limited to, one or more rotors in a screw compressor. The outlet 156a may be optional and included when, for example, lubricant is injected into a compression pocket during the compression cycle. The fluid connection between the outlet 156a and the first compressor component can be via an optional lubricant return line (e.g., the lubricant return line 28b in FIG. 1).

The outlet 156b is fluidly connected to a second compressor component. In an embodiment, the second compressor component can include a component such as, but not limited to, one or more bearings. The fluid connection between the outlet 156b and the second compressor component can be via a lubricant return line (e.g., the lubricant return line 28a in FIG. 1).

The outlet 156c is fluidly connected to the condenser (e.g., the condenser 14 in FIG. 1) via the refrigerant line (e.g., the refrigerant line 20 in FIG. 1).

The housing 150a can be divided into separate chambers 158a and 158b by a divider 160. The chamber 158a can alternatively be referred to as the high pressure chamber 158a. The chamber 158b can alternatively be referred to as the low pressure chamber 158b. The low pressure chamber 158b has a pressure that is relatively lower than the high pressure chamber 158a. In an embodiment, the high pressure chamber 158a may have a pressure that is at or about a discharge pressure of the compressor. In an embodiment, the low pressure chamber 158b has a pressure that is approaching the suction pressure of the compressor.

In an embodiment, the divider 160 can be, for example, a plate or the like. The divider 160 can generally be made of a metal such as, but not limited to, steel, copper, or the like. The divider 160 generally facilitates a heat transfer relationship between the high pressure chamber 158a and the low pressure chamber 158b. Accordingly, suitable materials include those that facilitate the heat transfer relationship.

The high pressure chamber 158a receives a high pressure refrigerant/lubricant mixture via inlet 154. A high pressure gaseous refrigerant portion 162a of the refrigerant/lubricant mixture received via inlet 154 may be separated from a lubricant portion 162b by, for example, gravity, centrifugal, coalescing, a collision with a surface of outlet 156c, or the like. It will be appreciated that the specific separation of the refrigerant/lubricant mixture can occur in various ways and the particular type of separator is not intended to be limiting. The lubricant portion 162b may pool on the divider 160. It is to be appreciated that the refrigerant portion 162a may still have lubricant, but that the amount of refrigerant relative to the amount of lubricant is relatively greater than prior to separation from the refrigerant/lubricant mixture. Similarly, the lubricant portion 162b may still include refrigerant, but the amount of lubricant relative to the amount of refrigerant is relatively greater than prior to separation from the refrigerant/lubricant mixture.

A conduit 164 fluidly connects the lubricant portion 162b in the high pressure chamber 158a with the lubricant tank 152 (low pressure chamber 158b). The conduit 164 can include an expansion device 166 to reduce a pressure of the lubricant moving from the high pressure chamber 158a to the lubricant tank 152. Various types of expansion devices 166 can be included. In an embodiment, the expansion device 166 can be a fixed device, such as, but not limited to, an orifice. In an embodiment, the expansion device 166 can be a variable device, such as, but not limited to, an electronic expansion valve (EXV) or the like.

The conduit 164 is in thermal communication with the high pressure chamber 158a, which is at or about the discharge temperature of the compressor. As a result, the lubricant flowing through the conduit 164 to the lubricant tank 152 (low pressure chamber 158b) receives heat. Thus the conduit 164 may also be referred to as heat exchange coil or heat exchanger 164. In an embodiment, a length of the conduit 164, and accordingly an overall heat transfer surface area, can be controlled to provide heat to the lubricant. Accordingly, the conduit 164 may be made of a material such as a metal such as, but not limited to, steel, copper, or the like, suitable for facilitating heat transfer.

The conduit 164 is in fluid communication with the high pressure chamber 158a and the lubricant tank 152 (low pressure chamber 158b). Lubricant from the lubricant portion 162b enters the conduit 164 via the expansion device 166 and is provided to the lubricant tank 152 (low pressure chamber 158b).

The relatively higher pressure lubricant (e.g., lubricant portion 162b) can be provided from the outlet 156a to the first compressor component. The lubricant that flows into the lubricant tank (low pressure chamber 158b) can be provided via the outlet 156b to the one or more bearings of the compressor 12.

The reduction of pressure of the lubricant from the expansion device 166 may cause the lubricant in the low pressure chamber 158b to become a two-phase fluid (e.g., mixture including gas and liquid). As the pressure of the lubricant reduces, the refrigerant flashes off, which causes cooling of the lubricant as well. However, because of the heat exchange relationship with the higher pressure refrigerant/lubricant mixture (via the conduit 164 and the divider 160), the lubricant in the lubricant tank 152 (low pressure chamber 158b) receives heat rejected from the refrigerant/lubricant mixture in the high pressure chamber 158. The additional heat can, for example, reduce an amount of refrigerant in the lubricant.

In an embodiment, a pressure drop induced by the expansion device 166 can be selected to provide a pressure in the low pressure chamber 158b (lubricant tank 152) that is sufficient to drive the lubricant through a lubricant filter and into injection ports for the bearings without requiring a lubricant pump to provide the necessary pressure. The pressure drop may also be selected based on, for example, a compressor size and efficiency, a flow rate to the bearings, and a desired temperature for the lubricant in the lubricant tank 152.

In an embodiment, the arrangement of the lubricant tank 152 (low pressure chamber 158b) integrated with the lubricant separator 150 can reduce a complexity relative to a system that includes a separate lubricant separator 150 and lubricant tank 152. In an embodiment, heat present in the high pressure refrigerant/lubricant mixture can be rejected to the lower pressure lubricant in the lubricant tank (low pressure chamber 158b) via the divider 160. In an embodiment, the application of heat via the divider 160, the conduit 164, or a combination thereof can cause additional refrigerant to be separated from the lubricant, thereby improving lubricant quality, reducing lubricant dilution, and improving lubricant viscosity.

FIG. 5B represents an alternative configuration to that provided in FIG. 5A, according to an embodiment. In the lubricant separator 150 of FIG. 5B, the lubricant tank 152 (low pressure chamber 158b) is disposed at a top portion of the housing 150a. Accordingly, the conduit 164 extends upwardly from the lubricant portion 162b, through the refrigerant portion 162a, and into the lubricant tank 152 (low pressure chamber 158b).

FIG. 5C represents an alternative configuration to that provided in FIGS. 5A and 5B, according to an embodiment. In the lubricant separator 150 of FIG. 5C, the lubricant tank (low pressure chamber 158b) is disposed externally from the housing 150a. The lubricant tank 152 (low pressure chamber 158b) may be a conduit that surrounds the outlet 156c and receives heat in a heat exchange relationship with the high pressure, high temperature refrigerant exiting the lubricant separator 150. In an embodiment, the lubricant tank 152 (low pressure chamber 158b) can be secured to the lubricant separator 150. In an embodiment, the lubricant tank 152 (low pressure chamber 158b) can be a single piece, unitary construction with the lubricant separator 150. In an embodiment, the lubricant tank 152 (low pressure chamber 158b) can be physically separated from the lubricant separator 150.

In FIG. 5C, the conduit 164 is arranged externally from the housing 150a. It will be appreciated that the conduit 164 could be arranged internally to the housing 150a in an embodiment.

The embodiments of FIGS. 5A-5C are generally illustrating a combined lubricant separator 150 and lubricant tank 152. In an embodiment, the lubricant tank 152 can be separate from the lubricant separator 150. The lubricant tank 152 is generally positioned in a location of the refrigerant circuit 10 that can exchange heat with the refrigerant that is at or about a discharge temperature. In an embodiment, the lubricant tank 152 can be incorporated into the condenser 14.

Aspects:

Any one of aspects 1-11 can be combined with any one of aspects 12-16, 17-22, and 23-34. Any one of aspects 12-16 can be combined with any one of aspects 17-22 and 23-34. Any one of aspects 17-22 can be combined with any one of aspects 23-34.

Aspect 1. A heating, ventilation, air conditioning, and refrigeration (HVACR) system, comprising: a refrigerant circuit, including: a compressor, a condenser, an expansion device, and an evaporator fluidly connected; a controller electronically connected to the compressor, the controller configured to prevent the compressor from operating at a speed that is less than a minimum speed limit; and a lubricant separator having an inlet fluidly connected between the compressor and the condenser and a plurality of outlets, a first of the plurality of outlets being fluidly connected to the condenser and a second of the plurality of outlets being fluidly connected to one or more components of the compressor to provide a lubricant to the one or more components.

Aspect 2. The HVACR system of aspect 1, wherein the lubricant separator includes a lubricant tank and a divider separating the lubricant separator into a high pressure chamber and a low pressure chamber.

Aspect 3. The HVACR system of aspect 2, further comprising a conduit fluidly connecting the high pressure chamber and the low pressure chamber, the conduit having an expansion device disposed in a location of the high pressure chamber at which the expansion device is disposed in a liquid portion of lubricant such that the liquid portion can be provided from the conduit to the low pressure chamber.

Aspect 4. The HVACR system of aspect 3, wherein the expansion device is sized to induce a pressure drop to reduce a pressure of the lubricant being provided to the low pressure chamber.

Aspect 5. The HVACR system of any one of aspects 1-4, wherein the controller is configured to determine the minimum speed limit based on a bearing size, an efficiency of the compressor, a saturated suction temperature, and a saturated discharge temperature.

Aspect 6. The HVACR system of any one of aspects 1-5, wherein the controller is configured to override a cooling setting when the cooling setting corresponds to an operating speed for the compressor that is lower than the minimum speed limit.

Aspect 7. The HVACR system of any one of aspects 1-6, wherein the compressor is a variable speed screw compressor.

Aspect 8. The HVACR system of aspect 7, wherein the minimum speed limit is utilized for a bearing pitch velocity below at or about 300,000 mm/min.

Aspect 9. The HVACR system of any one of aspects 1-8, wherein the HVACR system uses R134a as refrigerant.

Aspect 10. The HVACR system of any one of aspects 1-8, wherein the HVACR system uses a refrigerant having a relatively lower GWP than R134a.

Aspect 11. The HVACR system of any one of aspects 1-8, wherein the HVACR system uses R1234ze(E) or R513A as refrigerant.

Aspect 12. A method of controlling a variable speed compressor, comprising: determining, using a controller of the variable speed compressor, a saturated suction temperature and a saturated discharge temperature; calculating, using the controller of the variable speed compressor, a minimum speed limit for the variable speed compressor based on the saturated suction temperature and the saturated discharge temperature; receiving, by the controller, a cooling requirement; determining a speed setting for the variable speed compressor based on the cooling requirement; and in response to determining that the speed setting is less than the minimum speed limit as calculated, overriding the speed setting and utilizing the minimum speed limit and cooling to meet the cooling requirement.

Aspect 13. The method of aspect 12, wherein in response to determining that the speed setting is greater than the minimum speed limit, cooling based on the speed setting to meet the cooling requirement.

Aspect 14. The method of one of aspects 12 or 13, wherein the calculating is based on the saturated suction temperature, the saturated discharge temperature, a bearing size, and compressor efficiency.

Aspect 15. The method of any one of aspects 12-14, wherein the variable speed compressor utilizes R1234ze(E) as refrigerant.

Aspect 16. The method of any one of aspects 12-15, wherein the minimum speed limit is utilized for a bearing pitch velocity below at or about 300,000 mm/min.

Aspect 17. A lubricant separator for a heating, ventilation, air conditioning, and refrigeration (HVACR) system, comprising: a first chamber; a second chamber; a conduit disposed in the first chamber and fluidly connected to the second chamber, wherein the first chamber includes an inlet that receives a refrigerant/lubricant mixture and an outlet that provides a refrigerant portion of the refrigerant/lubricant mixture, wherein the second chamber receives a lubricant portion of the refrigerant/lubricant mixture via the conduit, and the second chamber includes an outlet via which lubricant having a relatively lower pressure than the refrigerant/lubricant mixture is provided.

Aspect 18. The lubricant separator of aspect 17, wherein the second chamber is disposed in thermal communication with the first chamber.

Aspect 19. The lubricant separator of one of aspects 17 or 18, wherein the second chamber is external to the lubricant separator.

Aspect 20. The lubricant separator of any one of aspects 17-19, further comprising a divider, wherein the divider separates the first chamber and the second chamber.

Aspect 21. The lubricant separator of any one of aspects 17-20, further comprising a second outlet disposed in the first chamber, a high pressure lubricant being provided from the second outlet.

Aspect 22. The lubricant separator of any one of aspects 17-21, wherein an expansion device of the conduit is sized to provide a pressure reduction of the lubricant entering the conduit in the first chamber.

Aspect 23. A heating, ventilation, air conditioning, and refrigeration (HVACR) system, comprising: a refrigerant circuit, including: a compressor, a condenser, an expansion device, and an evaporator fluidly connected; a controller electronically connected to the compressor, the controller configured to prevent the compressor from operating at a speed that is less than a minimum speed limit.

Aspect 24. The HVACR system of aspect 23, further comprising a lubricant separator having an inlet fluidly connected between the compressor and the condenser and a plurality of outlets, a first of the plurality of outlets being fluidly connected to the condenser and a second of the plurality of outlets being fluidly connected to one or more components of the compressor to provide a lubricant to the one or more components.

Aspect 25. The HVACR system of 24, wherein the lubricant separator includes a lubricant tank and a divider separating the lubricant separator into a high pressure chamber and a low pressure chamber, the high pressure chamber having a relatively higher pressure than the low pressure chamber.

Aspect 26. The HVACR system of aspect 25, further comprising a conduit fluidly connecting the high pressure chamber and the low pressure chamber, the conduit having an expansion device disposed in a location of the high pressure chamber at which the expansion device is disposed in a liquid portion of lubricant such that the liquid portion can be provided from the conduit to the low pressure chamber.

Aspect 27. The HVACR system of aspect 26, wherein the expansion device is sized to induce a pressure drop to reduce a pressure of the lubricant being provided to the low pressure chamber.

Aspect 28. The HVACR system of any one of aspects 23-27, wherein the controller is configured to determine the minimum speed limit based on a bearing size, an efficiency of the compressor, a saturated suction temperature, and a saturated discharge temperature.

Aspect 29. The HVACR system of any one of aspects 23-28, wherein the controller is configured to override a cooling setting when the cooling setting corresponds to an operating speed for the compressor that is lower than the minimum speed limit.

Aspect 30. The HVACR system of any one of aspects 23-29, wherein the compressor is a variable speed screw compressor.

Aspect 31. The HVACR system of aspect 30, wherein the minimum speed limit is utilized for a bearing pitch velocity below at or about 300,000 mm/min.

Aspect 32. The HVACR system of any one of aspects 23-31, wherein the HVACR system uses R134a as refrigerant.

Aspect 33. The HVACR system of any one of aspects 23-31, wherein the HVACR system uses a refrigerant having a relatively lower GWP than R134a.

Aspect 34. The HVACR system of any one of aspects 23-31, wherein the HVACR system uses R1234ze(E) or R513A as refrigerant.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A heating, ventilation, air conditioning, and refrigeration (HVACR) system, comprising:
    a refrigerant circuit, including:
        a compressor, a condenser, an expansion device, and an evaporator fluidly connected; and
    a controller electronically connected to the compressor, the controller configured to:
    determine a minimum speed limit based on a bearing size, an efficiency of the compressor, a saturated suction temperature, and a saturated discharge temperature, and
    prevent the compressor from operating at a speed that is less than the minimum speed limit.

2. The HVACR system of claim 1, further comprising a lubricant separator having a plurality of outlets and an inlet, the inlet fluidly connected between the compressor and the condenser, a first of the plurality of outlets being fluidly connected to the condenser, and a second of the plurality of outlets being fluidly connected to one or more components of the compressor to provide a lubricant to the one or more components, wherein the lubricant separator includes a lubricant tank and a divider separating the lubricant separator into a high pressure chamber and a low pressure chamber that is discrete from the high pressure chamber.

3. The HVACR system of claim 2, further comprising a conduit fluidly connecting the high pressure chamber and the low pressure chamber, the conduit having a second expansion device disposed in a location of the high pressure chamber at which the second expansion device is disposed in a liquid portion of lubricant such that the liquid portion can be provided from the conduit to the low pressure chamber.

4. The HVACR system of claim 3, wherein the second expansion device is selected to induce a pressure drop to reduce a pressure of the lubricant being provided to the low pressure chamber.

5. The HVACR system of claim 1, wherein the controller is configured to override a cooling setting when the cooling setting corresponds to an operating speed for the compressor that is lower than the minimum speed limit.

6. The HVACR system of claim 1, wherein the compressor is a variable speed screw compressor.

7. The HVACR system of claim 6, wherein the minimum speed limit is utilized for a bearing pitch velocity below at or about 300,000 mm/min.

8. The HVACR system of claim 1, wherein the HVACR system uses an R134a replacement refrigerant having a relatively lower global warming potential (GWP) than R134a.

9. A method of controlling a variable speed compressor, comprising:
  determining, using a controller of the variable speed compressor, a saturated suction temperature and a saturated discharge temperature;
  calculating, using the controller of the variable speed compressor, a minimum speed limit for the variable speed compressor based on the saturated suction temperature and the saturated discharge temperature;
  receiving, by the controller, a cooling requirement;
  determining a speed setting for the variable speed compressor based on the cooling requirement; and
  in response to determining that the speed setting is less than the minimum speed limit as calculated, overriding the speed setting and utilizing the minimum speed limit and cooling to meet the cooling requirement.

10. The method of claim 9, wherein in response to determining that the speed setting is greater than the minimum speed limit, cooling based on the speed setting to meet the cooling requirement.

11. The method of claim 9, wherein the calculating is based on the saturated suction temperature, the saturated discharge temperature, a bearing size, and compressor efficiency.

12. The method of claim 9, wherein the variable speed compressor utilizes R1234ze(E) as refrigerant.

13. The method of claim 9, wherein the minimum speed limit is utilized for a bearing pitch velocity below at or about 300,000 mm/min.

14. A heating, ventilation, air conditioning, and refrigeration (HVACR) system, comprising:
  a refrigerant circuit, including:
    a compressor, a condenser, an expansion device, and an evaporator fluidly connected, and
    a lubricant separator having a plurality of outlets and an inlet, the inlet fluidly connected between the compressor and the condenser, a first of the plurality of outlets being fluidly connected to the condenser, and a second of the plurality of outlets being fluidly connected to one or more components of the compressor to provide a lubricant to the one or more components, wherein the lubricant separator includes a lubricant tank and a divider separating the lubricant separator into a high pressure chamber and a low pressure chamber;
  a conduit fluidly connecting the high pressure chamber and the low pressure chamber, the conduit having a second expansion device disposed in a location of the high pressure chamber at which the second expansion device is disposed in a liquid portion of lubricant such that the liquid portion can be provided from the conduit to the low pressure chamber; and
  a controller electronically connected to the compressor, the controller configured to prevent the compressor from operating at a speed that is less than a minimum speed limit.

* * * * *